US009736632B2

(12) United States Patent
Morioka et al.

(10) Patent No.: US 9,736,632 B2
(45) Date of Patent: Aug. 15, 2017

(54) USER APPARATUS AND AREA INFORMATION NOTIFICATION METHOD

(71) Applicant: NTT DOCOMO, INC., Tokyo (JP)

(72) Inventors: Yasufumi Morioka, Tokyo (JP); Kouki Hayashi, Tokyo (JP); Masanori Ishida, Tokyo (JP); Yoshifumi Morihiro, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/906,564

(22) PCT Filed: Jun. 10, 2014

(86) PCT No.: PCT/JP2014/065331
§ 371 (c)(1),
(2) Date: Jan. 21, 2016

(87) PCT Pub. No.: WO2015/019699
PCT Pub. Date: Feb. 12, 2015

(65) Prior Publication Data
US 2016/0157052 A1 Jun. 2, 2016

(30) Foreign Application Priority Data
Aug. 9, 2013 (JP) .................. 2013-166942

(51) Int. Cl.
*H04W 24/00* (2009.01)
*H04W 4/02* (2009.01)
(Continued)

(52) U.S. Cl.
CPC ............... *H04W 4/02* (2013.01); *H04M 3/42* (2013.01); *H04W 64/00* (2013.01); *H04W 24/00* (2013.01)

(58) Field of Classification Search
CPC ....... H04W 4/02; H04W 64/00; H04W 24/00; H04M 3/42
(Continued)

(56) References Cited

U.S. PATENT DOCUMENTS

2008/0102756 A1* 5/2008 Lehtinen .................. G01S 5/00
455/67.11
2010/0063854 A1* 3/2010 Purvis .................... G06Q 10/02
705/5

(Continued)

FOREIGN PATENT DOCUMENTS

JP 2006-031598 A 2/2006
JP 2007-067763 A 3/2007
(Continued)

OTHER PUBLICATIONS

International Search Report issued in application No. PCT/JP2014/065331 mailed Sep. 16, 2014 (2 pages).

*Primary Examiner* — Mong-Thuy Tran
(74) *Attorney, Agent, or Firm* — Osha Liang LLP

(57) ABSTRACT

A user apparatus includes processing modules that execute processing using basic area information, and an area information supply module that supplies basic area information to the processing modules. The area information supply module includes an event detection unit that detects an event, an area information acquisition unit that acquires basic area information in accordance with an event being detected, and an area information notification unit that notifies the processing modules of the basic area information. The area information acquisition unit acquires detailed area information in accordance with a request signal being received. The area information notification unit notifies a processing module of the detailed area information.

8 Claims, 4 Drawing Sheets

(51) Int. Cl.
H04M 3/42 (2006.01)
H04W 64/00 (2009.01)

(58) Field of Classification Search
USPC .............................. 455/456.2, 456.1, 456.3
See application file for complete search history.

(56) References Cited

U.S. PATENT DOCUMENTS

| | | | |
|---|---|---|---|
| 2010/0087188 A1* | 4/2010 | Griff | H04L 41/12 455/424 |
| 2010/0273463 A1* | 10/2010 | Bonnefoy | H04W 24/00 455/414.1 |
| 2012/0191512 A1* | 7/2012 | Wuoti | G06Q 30/0207 705/14.1 |
| 2013/0210465 A1* | 8/2013 | Poe | H04W 24/00 455/457 |
| 2014/0045530 A1* | 2/2014 | Gordon | G06Q 10/10 455/456.2 |
| 2014/0080517 A1* | 3/2014 | Martinez Olano | H04L 61/1541 455/456.2 |

FOREIGN PATENT DOCUMENTS

| | | |
|---|---|---|
| JP | 2010-262484 A | 11/2010 |
| JP | 2011-169800 A | 9/2011 |
| JP | 2012-208085 A | 10/2012 |

* cited by examiner

USER APPARATUS AND AREA INFORMATION NOTIFICATION METHOD

TECHNICAL FIELD

The present invention relates to a user apparatus and an area information notification method.

BACKGROUND ART

In recent years, technology has been proposed for providing a user apparatus with information that corresponds to the area in which the user apparatus exists (e.g., advertising information from stores that exist in the area), and technology has been proposed for controlling operations of the user apparatus in accordance with the area in which the user apparatus exists. The area that the user apparatus is located in is specified based on GPS (Global Positioning System) positioning information and information regarding the base station with which the user apparatus has a wireless connection, for example.

CITATION LIST

Patent Documents

Patent Document 1: JP 2010-262484A

SUMMARY OF INVENTION

Technical Problem

The role or function of the area (cell) that user apparatuses exist in (hereinafter, sometimes called a "location characteristic") differs depending on the users who are using the user apparatuses. For example, a complex facility that includes both a residential area and an office area is home to one user, but a work location to another user. In other words, there are cases where a facility in an area has different location characteristics according to different users.

Accordingly, in a user apparatus that executes a processing module for providing information corresponding to the location to the user apparatus and processing modules for controlling operations of the user apparatus according to the location, it is thought to be favorable for the location characteristic to be determined in accordance with the user, and for area information that includes the location characteristic to be provided to the processing modules. This is because it is possible for more appropriate information that reflects the location characteristic to be provided to the user, and operations of the user apparatus can be controlled more appropriately due to the location characteristic being reflected.

In consideration of the above circumstances, an object of the present invention is to appropriately supply area information to one or more processing modules that area executed in a user apparatus.

Solution to Problem

A user apparatus according to the present invention includes: a plurality of processing modules that each execute processing using basic area information that indicates information regarding a residing cell in which the user apparatus resides; and an area information supply module that supplies the basic area information to the plurality of processing modules, wherein the area information supply module includes an event detection unit that detects an event that occurs in the user apparatus, an area information acquisition unit that acquires the basic area information in accordance with the event being detected by the event detection unit, and an area information notification unit that notifies each of the plurality of processing modules of the basic area information acquired by the area information acquisition unit, at least one of the processing modules includes an information requesting unit that transmits a request signal for requesting the area information supply module to supply detailed area information that includes information different from the basic area information, the area information acquisition unit acquires the detailed area information regarding the residing cell in accordance with the request signal being received from the information requesting unit, and the area information notification unit notifies at least one of the processing modules of the detailed area information acquired by the area information acquisition unit.

In a preferred aspect of the present invention, the information requesting unit determines whether or not the request signal for requesting the detailed area information is to be transmitted based on the basic area information received from the area information notification unit.

In a preferred aspect of the present invention, the area information notification unit performs notification of the detailed area information acquired by the area information acquisition unit to only the processing module that comprises the information requesting unit that transmitted the request signal.

In a preferred aspect of the present invention, the area information notification unit performs notification of the detailed area information acquired by the area information acquisition unit to a plurality of processing modules that includes the processing module that comprises the information requesting unit that transmitted the request signal.

In a preferred aspect of the present invention, the basic area information includes a cell identifier that uniquely identifies the residing cell and a location characteristic of the residing cell, and the detailed area information includes the cell identifier and information regarding a landmark that exists in the residing cell.

An area information notification method according to the present invention is executed in a wireless communication system that includes a plurality of processing modules that each execute processing using basic area information that indicates information regarding a residing cell in which a user apparatus resides, and an area information supply module that supplies the basic area information to the plurality of processing modules. This area information notification method according to the present invention includes: in the area information supply module, detecting an event that occurs in the user apparatus; in the area information supply module, acquiring the basic area information in accordance with the event being detected; in the area information supply module, notifying each of the plurality of processing modules of the acquired basic area information; in at least one of the processing modules, transmitting a request signal for requesting the area information supply module to supply detailed area information that includes information different from the basic area information; in the area information supply module, acquiring the detailed area information regarding the residing cell in accordance with the request signal being received from the processing module; and in the area information supply module, notifying at least one of the processing modules of the acquired detailed area information.

Advantageous Effects of Invention

According to the present invention, area information is appropriately supplied to one or more processing modules that area executed in a user apparatus.

DESCRIPTION OF EMBODIMENTS

1(1). Overview of Wireless Communication System

Figure 1:
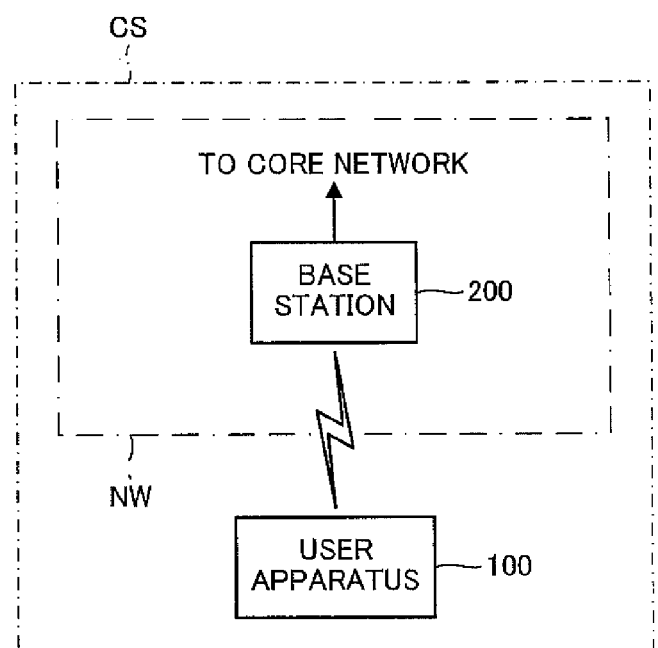
FIG. 1 is a block diagram showing a wireless communication system according to an embodiment.

FIG. 1 is a block diagram showing a wireless communication system CS according to an embodiment of the present invention. The wireless communication system CS includes a user apparatus 100 and a base station 200 as constituent elements. The base station 200 is connected to a core network that includes a gateway, a switching center, and constituent elements other than the aforementioned elements, which are not depicted. A network NW includes the aforementioned constituent elements included in the wireless communication system CS, excluding the user apparatus 100.

The constituent elements in the wireless communication system CS execute communication in accordance with any access technology. One example of an applicable access technology is the LTE/SAE (Long Term Evolution/System Architecture Evolution) standard included in the 3GPP (Third Generation Partnership Project) standard. Frequency division multiplexing may be used as the wireless access multiplexing system, or time division multiplexing may be used. More than one wireless access technology (e.g., 3G and LTE) may be employed in the wireless communication system CS.

Figure 2:
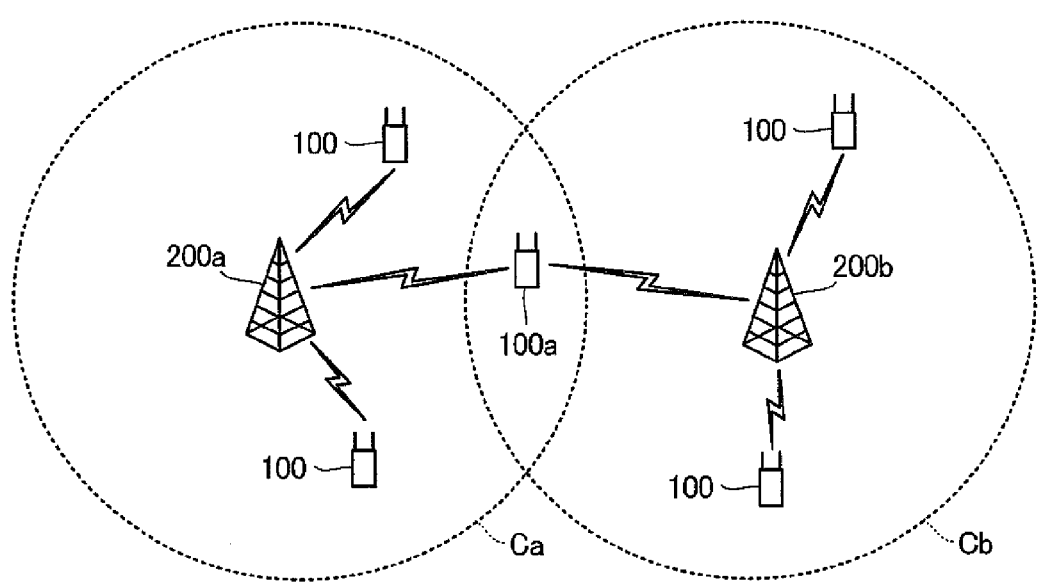
FIG. 2 is a diagram showing cells formed by base stations according to the embodiment.

As shown in FIG. 2, each base station 200 (200a, 200b) forms a cell C (Ca, Cb) around itself. Each cell C is identified by a unique cell identifier. The cell identifier is transmitted as data included in a control signal from the base station 200, and is received by the user apparatus 100. The user apparatus 100 can perform wireless communication with the base station 200 that corresponds to the cell C that the user apparatus 100 resides in (is in range of). Note that one base station 200 may form multiple cells C. Any wireless access technology can be selected for use in each cell C. For example, one wireless access technology may be applied in common in multiple cells C formed by one base station 200, or different wireless access technologies may be applied in the cells C.

In FIG. 2, a user apparatus 100a can be in range of both the cell Ca and the cell Cb (i.e., is located at the cell edges of the cell Ca and the cell Cb). The wireless communication environment changes from moment to moment, and therefore the cell C that the user apparatus 100a resides in (e.g., the cell C having the highest received power according to the user apparatus 100a) also changes between the cell Ca and the cell Cb from moment to moment. If the above-described change between residing cells occurs frequently regardless of the user apparatus 100a not moving very much, this is generally called ping-ponging or fluttering.

1(2). Configurations of Constituent Elements

1(2)-1. Configuration of User Apparatus

Figure 3:
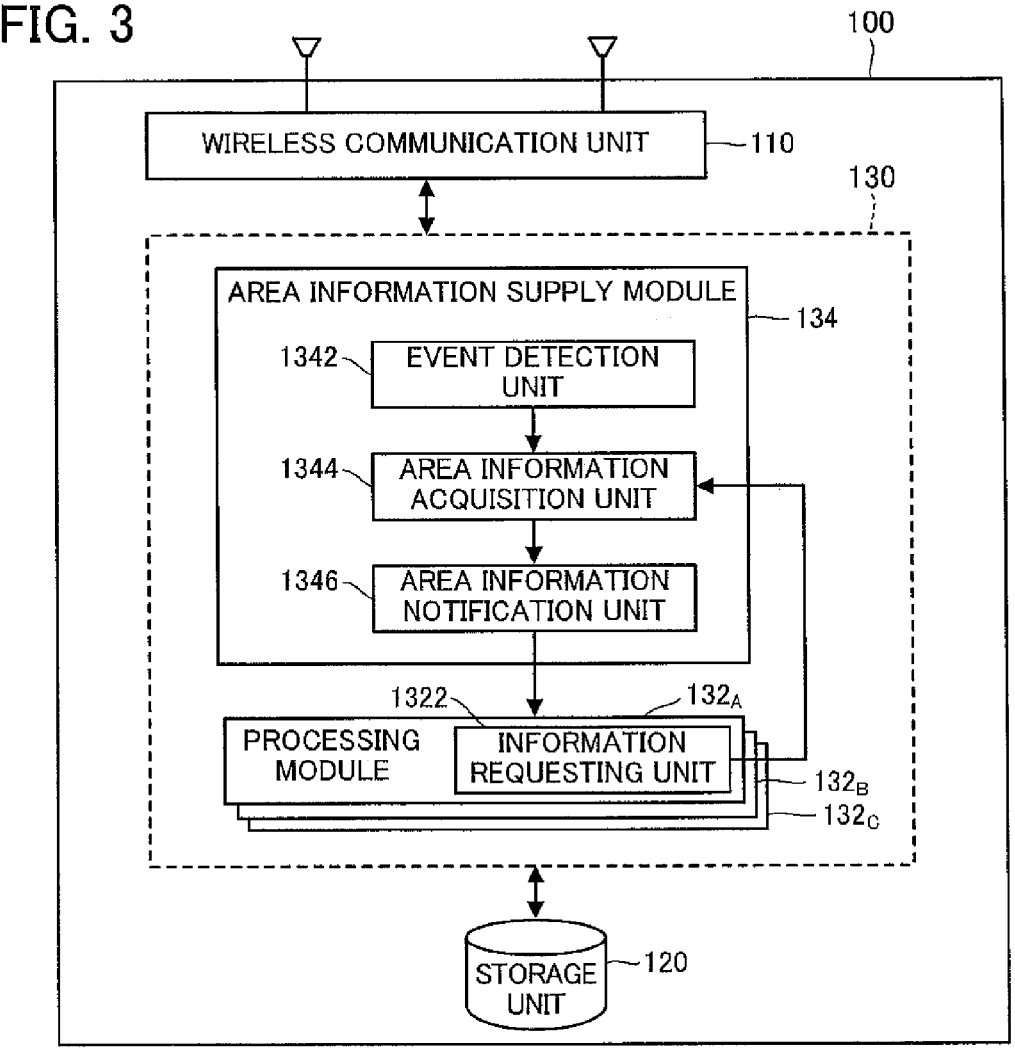
FIG. 3 is a block diagram showing a configuration of a user apparatus according to the embodiment.

FIG. 3 is a block diagram showing the configuration of the user apparatus 100 according to this embodiment. The user apparatus 100 includes a wireless communication unit 110, a storage unit 120, and a control unit 130. It also includes an output apparatus for outputting audio, video, and the like, an input apparatus for accepting instructions from a user, and the like, but depictions thereof have been omitted for the sake of convenience. The wireless communication unit 110 is a constituent element for executing wireless communication with the base station 200, and includes a transmission/reception antenna, a reception circuit that receives a downstream wireless signal from the base station 200 and converts it into an electrical signal, and a transmission circuit that converts an electrical signal such as a control signal or a user signal into an upstream wireless signal. The storage unit 120 stores information regarding communication control, and in particular residing information regarding the residing of the user apparatus 100 in a cell. The residing information includes multiple residing information elements that each correspond to one instance of residing.

The control unit 130 includes multiple processing modules 132 ($132_A$, $132_B$, ... ), and an area information supply module 134. Each processing module 132 executes processing (e.g., providing information to a user) using basic area information that includes information regarding the residing cell in which the user apparatus 100 resides. The processing module 132 may include an information requesting unit 1322 that requests detailed area information from the area information supply module 134.

The area information supply module 134 supplies basic area information to the processing modules 132. The area information supply module 134 includes an event detection unit 1342, an area information acquisition unit 1344, and an area information notification unit 1346. The event detection unit 1342 detects events that occur in the user apparatus 100. The area information acquisition unit 1344 acquires area information (basic area information and detailed area information). The area information notification unit 1346 notifies the processing module 132 of area information acquired by the area information acquisition unit 1344.

A more detailed description of operations of the constituent elements in the control unit 130 will be given later. The control unit 130 and the constituent elements in the control unit 130 are function blocks realized by a CPU (not shown) in the user apparatus 100 executing computer programs stored in the storage unit 120 and functioning in accordance with the computer programs.

1(2)-2. Configuration of Base Station

Figure 4:
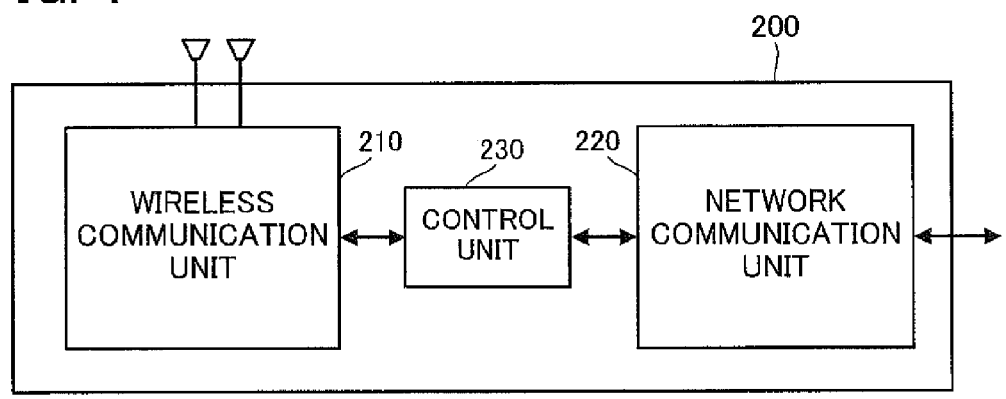
FIG. 4 is a block diagram showing a configuration of a base station according to the embodiment.

FIG. 4 is a block diagram showing the configuration of the base station 200 according to this embodiment. The base station 200 includes a wireless communication unit 210, a network communication unit 220, and a control unit 230. The wireless communication unit 210 is a constituent element for executing wireless communication with the user apparatus 100, and has a configuration similar to that of the wireless communication unit 110 of the user apparatus 100. The network communication unit 220 is a constituent element for executing wired communication with other nodes in the network NW (e.g., other base stations 200, the switching center, and the gateway). The control unit 230 exchanges signals (e.g., control signals and data signals)

with the user apparatus 100 and other nodes in the network NW via the wireless communication unit 210 and the network communication unit 220. The control unit 230 is a function block that is realized by a CPU (not shown) in the base station 200 executing a computer program stored in a storage unit (not shown) and functioning in accordance with the computer program.

1(3). Supply of Area Information

Figure 5:
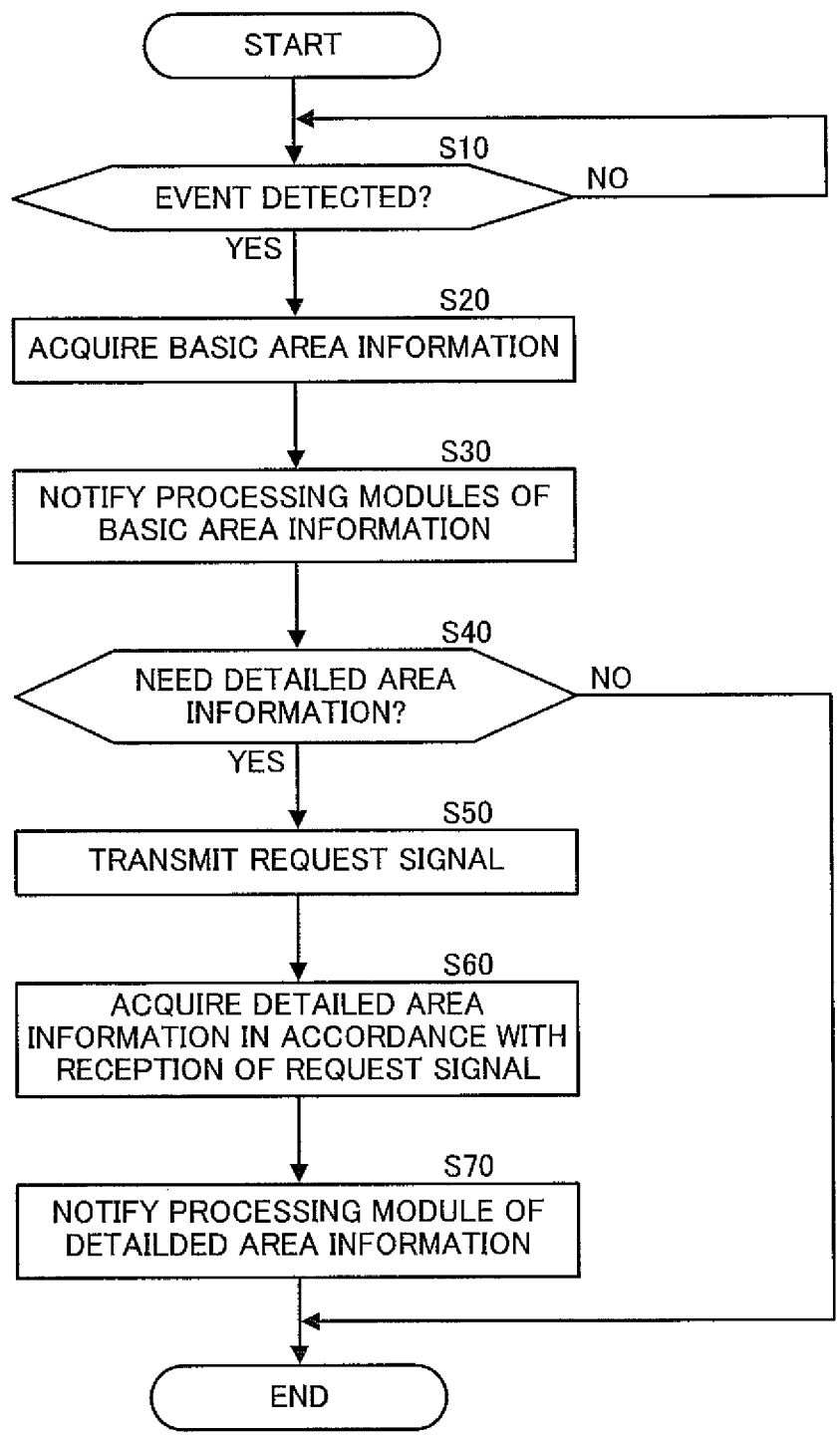
FIG. 5 is a flowchart showing an area information supply operation according to the embodiment.
Figure 6:
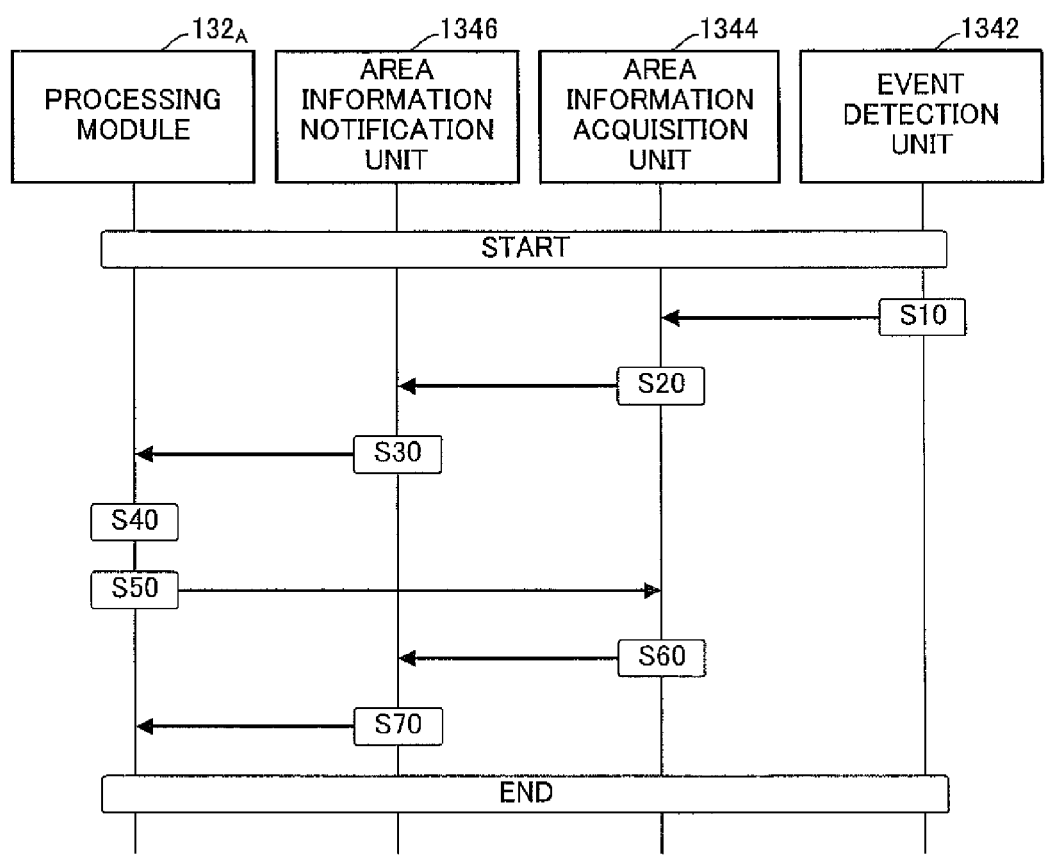
FIG. 6 shows a flow of information related to the area information supply operation according to the embodiment.

The following describes the supply of area information according to the present embodiment. FIG. 5 is a flowchart showing an area information supply operation. FIG. 6 shows a flow of information related to the area information supply operation.

1(3)-1. Types of Events

In the present embodiment, the start of the area information supply operation is triggered by an event being detected by the event detection unit 1342. In view of this, prior to the description of the information supply operation, the following gives examples of events that can be detected in the present embodiment. Note that events other than the events given below may be detected by the event detection unit 1342.

Event 1a: some sort of application (service) is started up, and the cell identifier indicated by the most recent residing information element matches the current cell identifier detected by the control unit 130.

Event 1b: some sort of application (service) is started up, and the cell identifier indicated by the most recent residing information element does not match the current cell identifier detected by the control unit 130.

Event 1c: some sort of application (service) is started up, and the cell identifier indicated by the most recent residing information element does not match the current cell identifier detected by the control unit 130, but it has been determined that the current cell identifier is in a fluttering state.

Event 2a: a change in the cell identifier of the residing cell is detected by the control unit 130, and it has not been determined that the detected new cell identifier is in the fluttering state.

Event 2b: a change in the cell identifier of the residing cell is detected by the control unit 130, and it has been determined that the detected new cell identifier is in the fluttering state.

Event 3a: the screen (output apparatus) is lit, and the cell identifier indicated by the most recent residing information element matches the current cell identifier detected by the control unit 130.

Event 3b: the screen (output apparatus) is lit, and the cell identifier indicated by the most recent residing information element does not match the current cell identifier detected by the control unit 130.

Event 3c: the screen (output apparatus) is lit, and the cell identifier indicated by the most recent residing information element does not match the current cell identifier detected by the control unit 130, but it has been determined that the current cell identifier is in a fluttering state.

Event 4: the screen (output apparatus) was unlocked.

Event 5: the screen (output apparatus) was turned off.

Event 6: a connection to a wireless LAN was made.

Event 7a: charging started, and the user apparatus 100 transitioned to the charging state.

Event 7b: charging ended, and the user apparatus 100 transitioned to the discharging state.

Event 8: event activation was requested by an application.

Event 9a: a predetermined time has elapsed since the previous event detection, and the cell identifier indicated by the most recent residing information element matches the current cell identifier detected by the control unit 130.

Event 9b: a predetermined time has elapsed since the previous event detection, and the cell identifier indicated by the most recent residing information element does not match the current cell identifier detected by the control unit 130.

Event 9c: a predetermined time has elapsed since the previous event detection, and the cell identifier indicated by the most recent residing information element does not match the current cell identifier detected by the control unit 130, but it has been determined that the current cell identifier is in the fluttering state.

Out of the above-described events, the events 2a and 2b that indicate that a change in the cell identifier was detected are "cell change events", and the other events are "no-change events".

1(3)-2. Details of Operations

The following is a detailed description of the area information supply operation with reference to FIGS. 5 and 6. In the area information supply module 134, in accordance with the event detection unit 1342 detecting some sort of event (1a, 1b, . . . ) (step S10: YES), the area information acquisition unit 1344 acquires basic area information (step S20). However, if an event has not been detected, the event detection unit 1342 executes an event detection wait loop (step S10: NO).

Basic area information includes the cell identifier of the residing cell and the location characteristic of the residing cell. The location characteristic of the residing cell can be determined using various standards and various algorithms. For example, it is preferred that the area information acquisition unit 1344 selects one information item (residing duration or the like) included in one or more residing information elements that correspond to the cell identifier of the residing cell, and determines the location characteristic using a statistic calculated with respect to the selected information item. Note that examples of the location characteristic include, but are not limited to, "home", "workplace", and "rail station".

The area information notification unit 1346 notifies the processing modules 132 ($132_A$, $132_B$, . . . ) of the basic area information acquired by the area information acquisition unit 1344 (i.e., broadcasts the basic area information to them) (step S30). The processing modules 132 receive the basic area information.

At least one processing module (in this example, the processing module $132_A$) among the processing modules 132 includes the information requesting unit 1322. The information requesting unit 1322 of the processing module $132_A$ determines whether or not detailed area information is to be requested based on the basic area information from the area information notification unit 1346 (step S40). Detailed area information is information that includes information different from the basic area information. For example, detailed area information includes the cell identifier of the residing cell and information regarding landmarks (distinctive facilities or buildings) that exist in the residing cell.

If processing in the processing module 132 can be executed using merely the received basic area information, the information requesting unit 1322 determines that there is no need to request detailed area information (step S40: NO). However, if processing cannot be executed using merely the received basic area information, the information requesting unit 1322 determines that detailed area information is to be requested (step S40: YES), and transmits a request signal for requesting detailed area information to the area information supply module 134 (area information acquisition unit 1344) (step S50).

In accordance with reception of the request signal from the information requesting unit 1322, the area information acquisition unit 1344 acquires detailed area information regarding the residing cell (step S60). The area information notification unit 1346 notifies the processing module 132 of the detailed area information acquired by the area information acquisition unit 1344 (step S70). The area information notification unit 1346 may perform notification of the detailed area information to only the processing module 132 that has the information requesting unit 1322 that transmitted the request signal (in this example, the processing module 132$_A$) (i.e., may unicast the detailed area information). Also, the area information notification unit 1346 may perform notification of the detailed area information to multiple processing modules 132 that include the processing module 132 that has the information requesting unit 1322 that transmitted the request signal.

1(4). Effects of Present Embodiment

According to the above configuration, basic area information is supplied to each processing module 132 in accordance with an event activation (i.e., in a push manner), whereas detailed area information is supplied based on a request from the processing module 132 (i.e., in a pull manner). As a result, basic area information is universally supplied to each processing module 132. Also, the amount of transmitted and received data and the amount of processing is lower than in a configuration in which all area information (basic area information and detailed area information) is supplied to the processing modules 132 in accordance with an event activation (in a push manner). The amount of transmitted and received data and the amount of processing is even lower in a configuration in which the notification of detailed area information is sent to only the processing module 132 that has the information requesting unit 1322 that transmitted the request signal.

2. Variations

The above embodiment can be modified in various ways. The following illustrates specific variation aspects. Any two or more aspects from among the above embodiment and following variations can be selected and combined appropriately as long as no contradiction with each other arises.

2(1). Variation 1

The basic area information can include the information illustrated below in addition to the information described above.

Wireless LAN connection history: information indicating whether the user apparatus 100 has connected to a wireless LAN in the cell C indicated by the cell identifier included in the basic area information.

Timestamp: information indicating the time at which the basic area information was generated or updated.

The detailed area information can include the information illustrated below in addition to the information described above.

Living area discriminator: information indicating whether or not the cell C indicated by the cell identifier included in the detailed area information is the living area of the user using the user apparatus 100.

Distance from daily hub: information indicating the distance (e.g., number of hops) from the user's daily hub (e.g., home or work location) to the cell C.

Workday discriminator: information indicating whether or not the cell C is the cell C in which the user resides on a workday.

Address: information indicating the address of the base station 200 that forms the cell C.

Base station latitude/longitude: information indicating the latitude and the longitude of the installation site of the base station 200 that forms the cell C.

Cell centroid latitude/longitude: information indicating the latitude and the longitude of the centroid of the cell C.

Timestamp: information indicating the time at which the detailed area information was generated or updated.

The above information may be supplied by an apparatus on the network NW side, such as the base station 200, and stored in the storage unit 120 of the user apparatus 100, may be acquired based on processing executed by the control unit 130, or may be acquired according to input from the user of the user apparatus 100.

2(2). Variation 2

In the above embodiment, the user apparatus 100 includes multiple processing modules 132 and the area information supply module 134. However, an apparatus on the network NW side (e.g., the base station 200) may include at least one module among the processing modules 132 and the area information supply module 134. Also, a portion of the function blocks included in the processing modules 132 and the area information supply module 134 may be provided in an apparatus on the network NW side (e.g., the base station 200). In other words, the constituent elements for carrying out the present invention can be arranged at arbitrary locations in the wireless communication system CS.

2(3). Variation 3

In the above embodiment, the area information notification unit 1346 transmits both the basic area information and the detailed area information. However, instead of the area information notification unit 1346, there may be a basic area information notification unit that transmits only basic area information and a detailed area information notification unit that transmits only detailed area information.

2(4). Variation 4

The user apparatus 100 is any apparatus that can perform wireless communication with the base station 200. The user apparatus 100 may be a mobile phone terminal such as a feature phone or a smartphone, a desktop personal computer, a notebook personal computer, a UMPC (Ultra-Mobile Personal Computer), a mobile gaming device, or another wireless terminal.

2(5). Variation 5

The functions executed by the CPUs in the constituent elements (the user apparatus 100 and the base station 200) in the wireless communication system CS may be executed by hardware instead of the CPUs, or may be executed by a programmable logic device such as an FPGA (Field Programmable Gate Array) or a DSP (Digital Signal Processor).

REFERENCE SIGNS LIST

100 User apparatus
110 Wireless communication unit
120 Storage unit
122 Event detection unit
124 Cell identifier detection unit
126 Fluttering determination unit
128 Location characteristic determination unit
130 Control unit
132 Processing module 1322 Information requesting unit
134 Area information supply module
1342 Event detection unit
1344 Area information acquisition unit
1346 Area information notification unit
140 Storage unit
200 Base station
210 Wireless communication unit
220 Network communication unit
230 Control unit
C Cell
CS Wireless communication system
NW Network

The invention claimed is:

1. A user apparatus comprising:
a plurality of processing modules that each execute processing using basic area information that indicates information regarding a residing cell in which the user apparatus resides; and
an area information supply module that supplies the basic area information to the plurality of processing modules,
wherein the area information supply module comprises
an event detection unit that detects an event that occurs in the user apparatus,
an area information acquisition unit that acquires the basic area information in accordance with the event being detected by the event detection unit, and
an area information notification unit that notifies each of the plurality of processing modules of the basic area information acquired by the area information acquisition unit,
at least one of the processing modules comprises
an information requesting unit that transmits a request signal for requesting the area information supply module to supply detailed area information that includes information different from the basic area information,
the area information acquisition unit acquires the detailed area information regarding the residing cell in accordance with the request signal being received from the information requesting unit, and
the area information notification unit notifies at least one of the processing modules of the detailed area information acquired by the area information acquisition unit,
wherein in the at least one processing module, determining whether or not the request signal for requesting the detailed area information is to be transmitted based on the basic area information received from the area information supply module.

2. The user apparatus according to claim 1, wherein the information requesting unit determines whether or not the request signal for requesting the detailed area information is to be transmitted based on the basic area information received from the area information notification unit.

3. The user apparatus according to claim 1, wherein the area information notification unit performs notification of the detailed area information acquired by the area information acquisition unit to only the processing module that comprises the information requesting unit that transmitted the request signal.

4. The user apparatus according to claim 1, wherein the area information notification unit performs notification of the detailed area information acquired by the area information acquisition unit to a plurality of processing modules that includes the processing module that comprises the information requesting unit that transmitted the request signal.

5. The user apparatus according to claim 1,
wherein the basic area information includes a cell identifier that uniquely identifies the residing cell and a location characteristic of the residing cell, and
the detailed area information includes the cell identifier and information regarding a landmark that exists in the residing cell.

6. The user apparatus according to claim 2, wherein,
in a case where processing in the at least one processing module requires the detailed area information in addition to the basic area information for the processing to be executed, the information requesting unit determines that the detailed area information is to be requested, and transmits the request signal for requesting the detailed area information to the area information supply module,
whereas in a case where processing in the at least one processing module does not require the detailed area information for the processing to be executed, the information requesting unit determines that there is no need to request the detailed area information.

7. An area information notification method in a wireless communication system that comprises a plurality of processing modules that each execute processing using basic area information that indicates information regarding a residing cell in which a user apparatus resides, and an area information supply module that supplies the basic area information to the plurality of processing modules, the area information notification method comprising:
in the area information supply module, detecting an event that occurs in the user apparatus;
in the area information supply module, acquiring the basic area information in accordance with the event being detected;
in the area information supply module, notifying each of the plurality of processing modules of the acquired basic area information;
in at least one of the processing modules, transmitting a request signal for requesting the area information supply module to supply detailed area information that includes information different from the basic area information;
in the area information supply module, acquiring the detailed area information regarding the residing cell in accordance with the request signal being received from the processing module; and
in the area information supply module, notifying at least one of the processing modules of the acquired detailed area information,
wherein in the at least one processing module, determining whether or not the request signal for requesting the detailed area information is to be transmitted based on the basic area information received from the area information supply module.

8. The area information notification method according to claim 7, wherein in the at least one processing module,
in a case where processing in the at least one processing module requires the detailed area information in addition to the basic area information for the processing to be executed, determining that the detailed area information is to be requested, and transmitting the request signal for requesting the detailed area information to the area information supply module,
whereas in a case where processing in the at least one processing module does not require the detailed area information for the processing to be executed, determining that there is no need to request the detailed area information.

\* \* \* \* \*